(12) United States Patent
Mise et al.

(10) Patent No.: US 6,570,532 B2
(45) Date of Patent: *May 27, 2003

(54) SUPPORT REQUEST PROCESSING SYSTEM USING GPS DATA FOR LOCATING A PERSON REQUESTING A SUPPORT

(75) Inventors: Toshiro Mise, Hirakata; Kiyotaka Takehara, Kitakatsuragi-gun; Akira Oya, Hirakata; Kazuhiro Honda, Kashiba, all of (JP)

(73) Assignee: Matsushita Electric Works, Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/768,452

(22) Filed: Jan. 25, 2001

(65) Prior Publication Data

US 2001/0009406 A1 Jul. 26, 2001

(30) Foreign Application Priority Data

Jan. 26, 2000 (JP) ........................................ 2000-017703

(51) Int. Cl.⁷ .............................. G01S 5/02; H04B 7/185
(52) U.S. Cl. ............................... 342/357.1; 342/357.09; 342/357.07
(58) Field of Search .......................... 342/357.09, 357.1, 342/357.07

(56) References Cited

U.S. PATENT DOCUMENTS

| 4,371,945 | A | | 2/1983 | Karr et al. .................. 702/160 |
|---|---|---|---|---|
| 5,119,102 | A | | 6/1992 | Barnard |
| 5,379,224 | A | | 1/1995 | Brown et al. |
| 5,652,570 | A | | 7/1997 | Lepkofker ................ 340/573.4 |
| 5,742,233 | A | | 4/1998 | Hoffman et al. .......... 340/573.1 |
| 5,796,365 | A | * | 8/1998 | Lewis |
| 5,982,281 | A | | 11/1999 | Layson, Jr. .................. 340/539 |
| 6,198,914 | B1 | * | 3/2001 | Saegusa ....................... 455/404 |
| 6,222,484 | B1 | * | 4/2001 | Seiple et al. ............ 342/357.09 |

FOREIGN PATENT DOCUMENTS

| DE | 43 40 285 A1 | 6/1995 |
|---|---|---|
| DE | 44 09 178 A1 | 9/1995 |
| DE | 44 23 369 C2 | 9/1996 |

* cited by examiner

Primary Examiner—Theodore M. Blum
(74) Attorney, Agent, or Firm—Rader, Fishman & Grauer PLLC

(57) ABSTRACT

A support request processing system using GPS data for locating a person requesting a support. The system is supplemented with a mobile terminal to be carried by the person separately from a GPS terminal left in the vehicle. The mobile terminal transmits a support request signal by way of a radio communication to the GPS terminal which responds to receive the GPS data from the GPS satellite and transmits the data to a message center. Upon receiving the GPS data, the message center calculates the position of the GPS terminal and notifies a warning message for rescue of the person. With the inclusion of the mobile terminal, the system can estimate the location of the person around the GPS terminal or the vehicle even when the person is within buildings where the GPS data from the GPS satellites is not available.

18 Claims, 13 Drawing Sheets

SUPPORT REQUEST PROCESSING SYSTEM USING GPS DATA FOR LOCATING A PERSON REQUESTING A SUPPORT

BACKGROUND OF THE INVENTION

1. Field of the Invention

The present invention is directed to a support-request processing system using GPS data for locating a person requesting a support, and more particularly to such a system using a decentralized Global Positioning System (GPS) to locate a person requesting the support.

2. Description of the Prior Art

A decentralized GPS system such as disclosed in U.S. Pat. Nos. 5,119,102 and 5,379,224 has been proposed to reduce search of a person requesting an urgent support for rescue. The system utilizes a GPS terminal to be carried by a person, and a message center which is linked through a radio communication network to the GPS terminal and acts in response to a support-request signal from the person to give a warning message including a position of the person for prompting a suitable support. The GPS terminal is capable of receiving GPS data from GPS satellites and of transmitting the support request signal together with the GPS data to the message center. The GPS data is processed at the message center rather than at the GPS terminal for calculating a position of the GPS terminal so as to eliminate a calculation circuitry from the GPS terminal and to make the GPS terminal compact sufficiently to be portable. Thus decentralized GPS system, however, is still insufficient in that when the person is in a dead-area such as a building where the GPS data from the GPS satellites is not available but the radio communication with the message center is available, the support-request signal can not be accompanied with a true GPS data so that the message center fails to locate the position of the person, making it difficult to rescue the person.

SUMMARY OF THE INVENTION

In view of the above insufficiency that the prior GPS system may have in locating the person requesting the support, and also in view of that the person is generally expected to move by vehicle and walk a short distance from the vehicle into buildings or the like area obstructing the GPS satellites, the present invention has been achieved to provide a system which is supplemented with a mobile terminal to be carried by the person separately from a GPS terminal left in the vehicle and receiving the GPS data, thereby enabling to estimate the location of the person around the GPS terminal or the vehicle even when the person is within buildings or a like area where the GPS data from the GPS satellites is not available, which is therefore a primary object of the present invention.

The system in accordance with the present invention includes a GPS terminal capable of receiving the GPS data from GPS satellites and transmits the GPS data to a radio communication network, and a message center which receives the GPS data from the GPS terminal through the radio communication network for processing the GPS data to calculate a position of the GPS terminal. The system additionally includes a mobile terminal provided separately from the GPS terminal to be carried by a person. The mobile terminal is capable of radio communication with the GPS terminal and is provided with a request key which issues a support-request signal upon being activated. The GPS terminal has a transmit means which, in response to the support-request signal, transmits the GPS data to the message center. At least one of the GPS terminal and the mobile terminal has an identification (ID) code which is transmitted through the radio communication network to the message center as a result of that the support-request signal is transmitted to the message center. The message center has a database table which stores a relation between the ID code and personal information about the person so that the message center can relate the position of the GPS terminal to the person giving the support-request signal. Further, the message center has an alarm means which notifies a support-request message including the personal information and the related position of the GPS terminal for prompting a suitable support action for the person requesting the support. Accordingly, even when the person is within the buildings or the like environment where the GPS satellites cannot be reached, the GPS data can be received by the GPS terminal which is located in a nearby position of acquiring the GPS data so that the message center can estimate the location of the person from the detected position of the GPS terminal.

Preferably, the mobile terminal transmits the support-request signal over the radio communication network so that the GPS terminal can be designed to use the radio communication network commonly for communication with the mobile terminal as well as the message center.

In one version of the present invention, the message center has a GPS calling device which, in response to the support-request signal, issues a GPS call signal to the GPS terminal through the radio communication network. The GPS terminal is activated by the GPS call signal to receive the GPS data from the GPS satellites and transmit the GPS data to the message center. Thus, the message center can firstly acknowledge the support-request signal and take over a subsequent procedure of locating the person under a supervision of the message center.

In this connection, the mobile terminal is provided with an ID data transmitting means for transmitting to the message center an identification (ID) data assigned to the mobile terminal The GPS calling device has a discriminating means which verifies the ID data and issues the GPS call signal only when the ID data from the mobile terminal matches one of registered ID data stored in the message center. Thus, the message center can proceed the locating operation only for the verified person, thereby eliminating erroneous locating operation.

Alternatively, in order to avoid the unnecessary locating operation, the message center may be provided with a registration means for registration of a call number assigned to the mobile terminal, and also with a call number verifying means which verifies the call number and causes the GS calling device to issue the GPS call signal only when the call number is registered in the registration means.

The mobile terminal is preferred to have an input means for entering a positional difference data indicating a positional difference between the mobile terminal carried by the person and the GPS terminal attached to, for example, the vehicle. The positional difference data is transmitted to the GPS terminal together with the support-request signal so that the GPS terminal responds to transmit the GPS data together with the positional difference data to the message center, thereby enabling the message center to estimate a location of the person around the GPS terminal in consideration of the positional difference. Thus, the actual position of the person around the GPS terminal can be successfully estimated.

In order to also give a reliable estimation of the person around the GPS terminal, the mobile terminal may be provided with a pedometer which counts the number of footsteps in walking by a person carrying the mobile terminal away from the GPS terminal to obtain a distance between the mobile terminal and the GPS terminal. Thus obtained distance is transmitted along with the support-request signal to the GPS terminal which in turn transmits the distance in addition to the GPS data to the message center in response to the support-request signal so that the message center can estimate a location of the person around the GPS terminal.

Further, the mobile terminal may include a direction detector in addition to a pedometer counting the number of footsteps of the person in walking away from the GPS terminal. The direction detector is provided to detect a direction in which the person walks away from the GPS terminal. The mobile terminal also includes an estimating means for analyzing the number of the footsteps and the direction to give an estimated distance between the GPS terminal and the mobile terminal. The estimated distance is then transmitted together with the support-request signal to the GPS terminal which is in turn made active to transmit the GPS data as well as the estimated distance to the message center so that the message center can estimate a location of the person around the GPS terminal.

Instead, the GPS terminal may be equipped with a direction entry means for entering a direction in which the person carrying the mobile terminal intends to move away from the GPS terminal. Thus entered direction is transmitted together with the GPS data to the message center so that the message center can estimate a location of the person around the GPS terminal, taking the distance into consideration.

In another version, the system is contemplated to give a warning when the person has not returned to the GPS terminal within a predetermined time period. For this purpose, the GPS terminal is designed to include a timer counting a time, a set-and-reset means, and a return-check means. The set-and-reset means is provided for setting a scheduled absent time period during which the person intends to be kept away from the GPS terminal and activating the timer to start counting the time, and for resetting the timer to stop counting, respectively. The return-check means judges whether or not the time is reset within the scheduled absent time period and issues a warning signal when the timer is not reset within the scheduled absent time period. Upon occurrence of the warning signal, the GPS terminal transmits the GPS data together with the warning signal to the message center so that the message center responds to give a warning message indicative of that the person has not returned to the GPS terminal within the scheduled absent time period and to calculate the position of the GPS terminal. Thus, the message center can give the warning that the person may be certainly involved in a trouble, thereby enabling an immediate support or rescue by the help of the known position of the GPS terminal.

In this connection, the return-check means may be designed to issue a confirmation signal rather than issuing the warning signal when the timer is not reset within the scheduled absent time period. Also, the mobile terminal includes an extension means capable of issuing an extension-request signal in reply to the confirmation signal. In the presence of the extension-request signal, the GPS terminal acts to extend the scheduled absent time period and otherwise acts to provide an absent warning and to transmit the GPS data together with the absent warning to the message center, whereby the message center can give a warning message indicative of that the person has not returned to the GPS terminal within the scheduled absent time and calculate the position of the GPS terminal for immediate support or rescue of the person. In this version, the system can afford flexible in matching with an individual behavior of the person for reliable supervision of the person.

In the meanwhile, the mobile terminal may be designed to have a capability of communicating with the GPS terminal by way of a minute power radio communication for transmitting the support-request signal to the GPS terminal, thereby simplifying the circuit configuration of the mobile terminal and reducing the manufacturing cost thereof.

In this instance, the mobile terminal is preferred to have a communication check means and a display. The communication check means checks regularly whether the mobile terminal is within an effective range for communication with the GPS terminal and provides a disable signal when the mobile terminal goes out of the effective range. Upon seeing the disable signal, the mobile terminal gives an out-of-range message on the display, prompting the person to move back into the effective range if the support-request is impending.

For the system where the mobile terminal communicates with the GPS terminal by use of the minute power radio communication, the GPS terminal may include an antenna with varying directivity for radio communication with the mobile terminal, and a direction detector which detects a direction in which the antenna shows the strong directivity. The GPS terminal acts, in response to the support-request signal, to transmit the GPS data as well as the detected direction to the message center so that the message center can estimate a location of the person around the GPS terminal with the help of the direction.

Further, instead of or in addition to the direction detector, the GPS terminal may include a recording mean which records a received field strength varying with time for the radio communication with the mobile terminal. The GPS terminal, in response to the support-request signal, transmits the latest data of the received field strength along with the GPS data to the message center. The message center has a means which analyzes the received field strength data to estimate a location of the person around the GPS terminal.

Still further, the GPS terminal may include a time counter which counts a time while the mobile terminal is out of range for communication with the GPS terminal, and a check means which issues a time warning signal when the counted time exceeds a predetermined level. The time warning signal is then transmitted together with the GPS data to the message center so that the message center can acknowledge and indicate that the person carrying the mobile terminal has not returned into the range capable for communication with the GPS terminal within a predetermined time. Thus, the message center can notify that the person is possibly involved in a trouble and take a suitable support for the person based upon the detected position of the GPS terminal.

In a further version of the present invention, the system includes a charger adapted to be coupled to the GPS terminal for charging a rechargeable battery incorporated in the GPS terminal. The charger has a radio communication means for receiving the support-request signal from the mobile terminal by way of a minute power radio communication. The GPS terminal is designed to have an inlet which is in direct connection with an outlet of the charger to take the support-request signal received at the radio communication means. Thus, even when the GPS terminal is brought back to the person's home or the like premises for charging the battery, the GPS terminal can successfully responds to the support-request signal from the mobile terminal simply by disposing the GPS terminal together with the charger near a window or the like location where the GPS satellites can be viewed.

Alternatively, the system may include an intermediate receiver in combination with the charger for extending a distance of radio communication between the mobile terminal and the GPS terminal within the premises. The intermediate receiver is provided to receive the support-request from the mobile terminal, while the charger is adapted to be coupled to an AC power line to obtain therefrom a charging current. The intermediate receiver is adapted to be coupled also to the AC power line and has a superimpose means by which the support-request signal is superimposed upon an AC source voltage supplied through the AC power line. The charger has a signal extract means which extracts the support-request signal from the AC source voltage and feeds the same to the GPS terminal through a direct coupling therebetween. Thus, the mobile terminal can successfully transmit the support-request signal to the GPS terminal by way of the intermediate receiver over an extended distance within the premises while the GPS terminal is being charged.

These and still other objects and advantageous features of the present invention will become more apparent from the following description of the embodiments when taken in conjunction with the attached drawings.

DETAILED DESCRIPTION OF THE PREFERRED EMBODIMENTS

Figure 1:
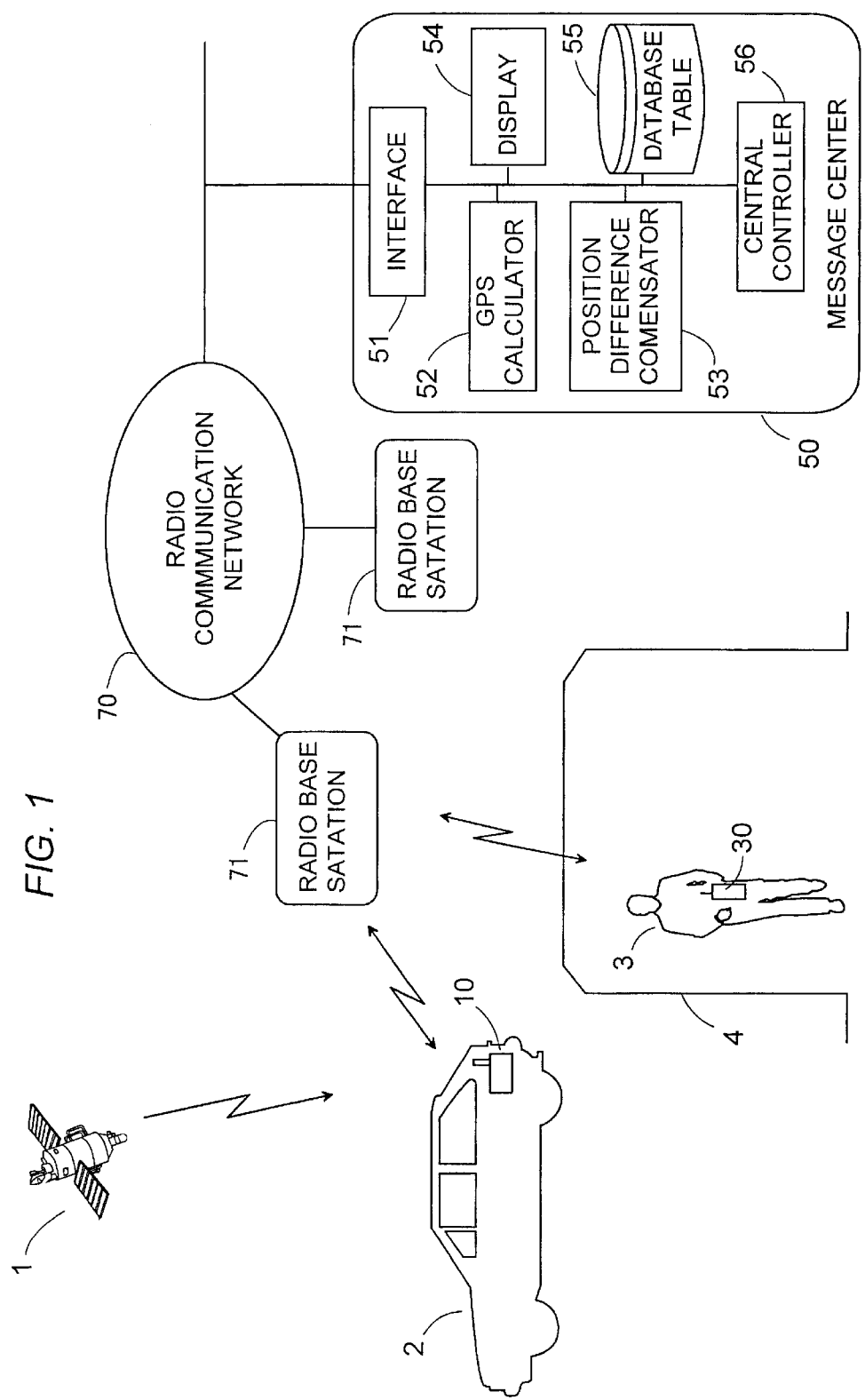
FIG. 1 is a schematic diagram showing a system in accordance with a first embodiment of the present invention.

First Embodiment <FIGS. 1 and 2>

Referring now to FIGS. 1 and 2, there is shown a support request processing system using GPS data from GPS satellites for locating a person requesting a support. The system utilizes a global positioning system (GPS) to locate the person in trouble and give a warning message, prompting to take a suitable support or rescue. The system is particularly intended to supervise the person 3 who travels around by a vehicle 2 and walks away from the vehicle possibly into building or the like premises 4 where the GPS satellites 1 can not be reached. The system includes a GPS terminal 10 capable of receiving GPS data from the GPS satellites 1, a message center 50 receiving the GPS data from the GPS terminal 10 to calculate a position of the GPS terminal 10, and a mobile terminal 30 provided separately from the GPS terminal 10 in order to issue a support-request signal to be acknowledge by the message center 50.

The GPS terminal 10 is primarily designed to be attached to the vehicle 2 so as to be in constant communication with the GPS satellites 1, while the mobile terminal 30 is designed to be carried by the person 3 who is expected to get off the vehicle 2 and to move into the building or the like location 4 where the GPS satellites 1 can not be reached. The GPS terminal 10 has an identification code or number (hereinafter sometimes referred to as GPS terminal ID code or number) which is transmitted together with the GPS data to the message center 50. The GPS terminal 30 and the mobile terminal 10 establish a radio communication link with the message center 50 through a public radio communication network 70 having a number of radio base stations 71. The network may be a known cellular phone communication network for PDS, PHS, MCA, CDPD, AMPS, CDMA, GSM or the like system.

Figure 2B:
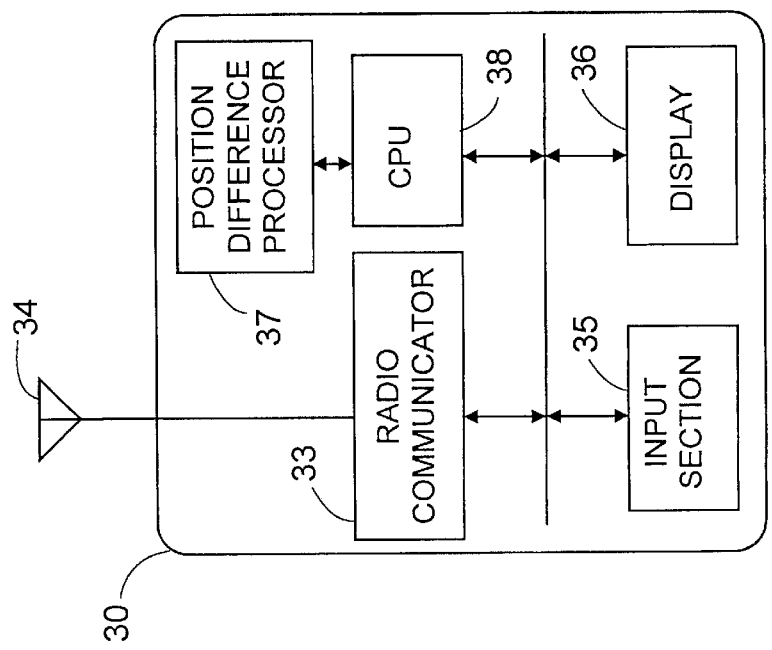
FIGS. 2A and 2B are block diagrams respectively showing internal structures of a GPS terminal and a mobile terminal utilized in the system.
Figure 2A:
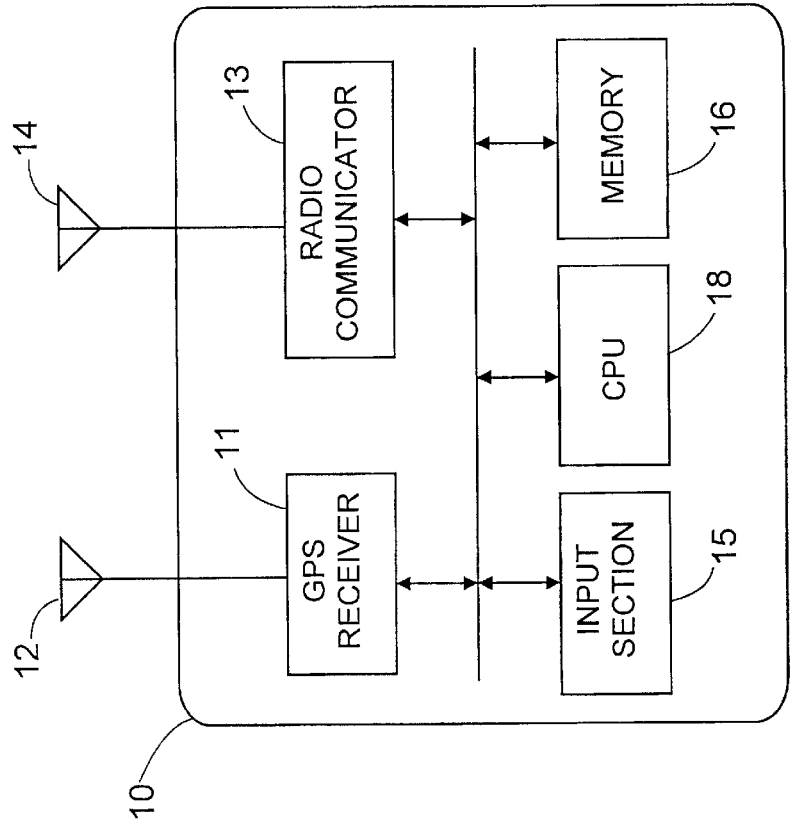

As shown in FIG. 2A, the GPS terminal 10 has a GPS receiver 11 which receives the GPS data from the GPS satellite 1 by use of an GPS antenna 12, and a radio communicator 13 which communicates with the network 70 by use of a radio antenna 14 for transmitting the GPS data and the GPS terminal ID number to the message center 50. Also included in the GPS terminal 10 are an input section 15 such as a keyboard for entry of specific information about the GPS terminal 10, a memory 16 storing the GPS data and the information, and a CPU 18 controlling the operations of these units. A rechargeable battery (not shown) Is incorporated in the GPS terminal 10 to supply an operating voltage thereto.

As shown in FIG. 2B, the mobile terminal 30 has a radio communicator 33 for communication with the radio network 70 by use of a radio antenna 34, an input section 35, a display 36, a position difference processor 37, and a CPU 38 for controlling the operation of these units. Also, a rechargeable battery (not shown) is incorporated to supply an operating voltage to the mobile terminal 30. The input section 35 has a keyboard for entry of message or information, and particularly includes a request key which generates the support-request signal simply by being pressed. The support-request signal may be transmitted together with detailed information that the person enters at the input section 35. Also, the input section 35 allows the person 3 to enter an expected positional difference between the person 3 and the vehicle 2. i.e., an intended distance and direction in which the person plans to move away from the vehicle, for example, "20 m to north", or "30 m to east". The data being entered at the input section 35 is confirmed at the display 36. The position difference processor 37 is provided in the mobile terminal 30 to convert the positional difference entered at the input section into a suitable format for transmission to the message center 50 through the GPS terminal 10. Also, the mobile terminal 30 has its identification code or number (hereinafter sometimes referred to as mobile terminal ID code or number) which is transmitted to the GPS terminal 10 when calling the same.

When the person gives the support-request signal at the mobile terminal 10, the radio communicator 13 of the mobile terminal 10 responds to call the GPS terminal 30 and transmit the mobile terminal ID number in addition to the positional difference data. In the absence of the call signal, the GPS terminal 10 is active only at CPU 18 and radio communicator 13. Immediately upon receiving the call signal at radio communicator 33, CPU 18 activates all units of the GPS terminal 10 and verifies the mobile terminal ID number accompanied with the call signal. When the ID number is verified, the GPS receiver 11 is made active, in response to the support-request signal, to receive the GPS data from the GPS satellites 1 and store the same into the memory 16, and disconnects the communication with the mobile terminal 30. Then, the radio communicator 13 opens a channel with the message center 50 through the network 70, and transmits the received GPS data, the support-request signal, and the position difference data together with the GPS terminal ID number to the message center 50.

The message center 60 includes, as shown in FIG. 1, an interface 51 for the network 70, a GPS calculator 52 for calculating the position of the GPS terminal based on the GPS data, and a position difference compensator 53 for modifying the position with the positional difference to obtain an estimated position of the person 3 carrying mobile terminal 30. Also included in the message center 50 are a display 54 as one of alarm means for giving a warning message indicative of the support-request from the person and the calculated position of the GPS terminal 10 as well as the estimated position of the person. Further, the message center 50 includes a database table 55, and a central controller 56 which controls the overall operations of the message center 50. The database table 55 stores personal information about an individual person registered to the system including a name, age, sex, residence, phone number, family data, etc. as well as the GPS terminal and mobile terminal ID numbers assigned to that person. With reference to the table 55, the central controller 56 can identify the support-requesting person by the GPS terminal ID number. The personal information of thus identified person is shown on the display 54 together with the warning message and the estimated position of the mobile terminal 30 and the detected position of the GPS terminal 10, prompting to take an immediate support for rescue. The message center may be provided with a speaker which issues the warning message.

Although the message center 50 is designed to identify the person by the GPS terminal ID number transmitted from the GPS terminal 10 with reference to the table 55, the person could be also identified by the mobile terminal ID number received through the GPS terminal 10. In addition, the message center 50 could be designed to check both the GPS terminal and mobile terminal ID numbers for avoiding possible errors.

Further, the system of the present embodiment is described with reference to one typical application for locating the person around the vehicle for rescue of the person, however, the system could be equally utilized to locate the GPS terminal for immediate search of the vehicle or the like object when recognized to be stolen.

Figure 3:
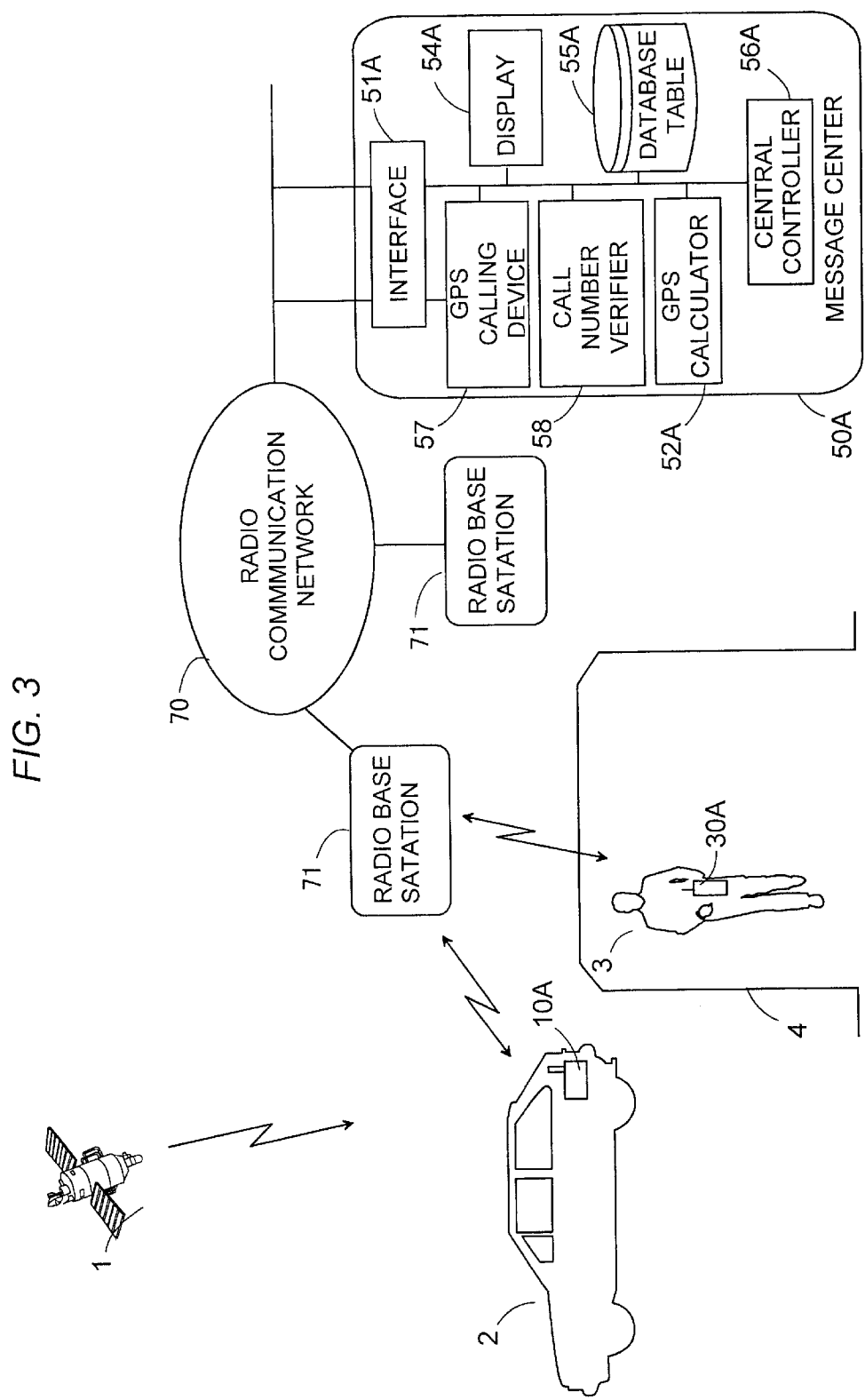
FIG. 3 is a schematic diagram showing a system in accordance with a second embodiment of the present invention.

Second Embodiment <FIG. 3>

FIG. 3 shows a system in accordance with a second embodiment of the present invention which is identical to the first embodiment except that the GPS terminal 10A is called by the message center 50A rather than directly by the mobile terminal 30A. Like units are designed by like reference numerals with a suffix letter of "A". The message center 50A additionally includes a GPS calling device 57 which receives the call from the mobile terminal 30A through the network 70, and responds to call the GPS terminal 10A demanding the GPS data therefrom. Upon receiving the call from the mobile terminal 30A, the GPS calling device 57 issues a voice message to the mobile terminal 30A, prompting the person to enter a personal ID assigned by the system and the support-request. Then, the person carrying the mobile terminal 30A responds to enter the personal ID and the support-request at the input section. In this respect, the input section and the radio communicator are cooperative to define the ID data transmitting means for transmitting the personal ID data. The personal ID may be the mobile terminal ID number or another code, and the support-request may be entered either by inputting a message or simply by pressing the support-request key. When receiving the personal ID and the support-request signal from the mobile terminal 30A, the GPS calling device 57 verifies the personal ID with reference to the database table 55A. For this purpose, the table 55A include the personal ID when it is adopted to be sent back to the message center 50A. Upon the personal ID being verified as valid, the GPS calling device 57 is made active to search the call number of the corresponding GPS terminal 10A from the table 55A, and generates a GPS call signal which is then transmitted to the corresponding GPS terminal 10A for requesting the GPS data. Thus, the GPS calling device has a discriminating means to verify the personal ID. In reply to the GPS call signal, the GPS terminal 10A transmits the GPS data together with the GPS terminal ID code to the message center 50A where they are processed to calculate the position of the GPS terminal, and to relate the person requesting the support to the calculated position in a similar fashion as explained with reference to the first embodiment. Although the present embodiment is shown without the position difference compensator as utilized in the first embodiment, it may be equally included in the system for locating the position of the person 3 around the vehicle 2.

The system of the present embodiment further includes a call number verifier 58 in case when the personal ID is selected as the call number of the mobile terminal 30A. The call number verifier 58 checks whether the call number transmitted from the mobile terminal 30A is registered in the table 55A as a valid subscriber, and allows the GPS calling device 57 to generate the GPS call signal only when the mobile terminal call number is valid or registered, thereby avoiding erroneous callings. In this case, the database table 55A defines a registration means for registration of the call number.

Figure 4:
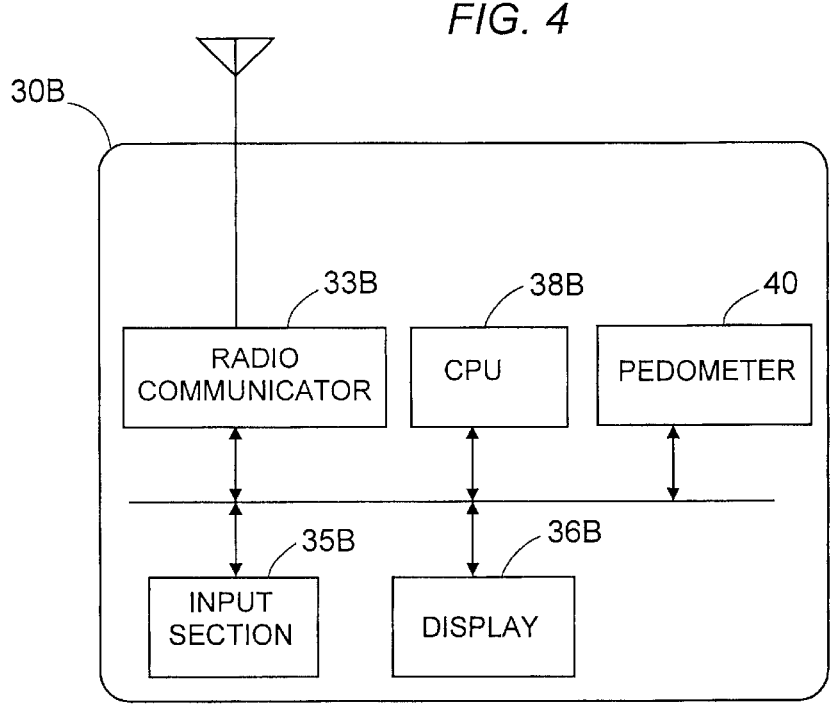
FIG. 4 is a block diagram showing an internal structure of a mobile terminal utilized in a system of a third embodiment of the present invention.

Third Embodiment <FIG. 4>

FIG. 4 shows a system in accordance with a third embodiment of the present invention which is identical to the first embodiment except that the mobile terminal 30B includes a pedometer 40 instead of the position difference processor 37. Like units are designated by like reference numerals with a suffix letter of "B". The pedometer 40 counts the number of the footsteps in walking by the person 3 when moving away from the GPS terminal to obtain a distance between the mobile terminal 30B carried by the person and the GPS terminal left in the vehicle 2. Thus obtained distance is transmitted together with the support-request signal from the radio communicator 33B through the network 70 to the GPS terminal. Then, the GPS terminal responds to transmits the distance in addition to the GPS data, the support-request signal, and the GPS terminal ID number to the message center which in turn estimates the position of the person based upon the calculated position of the GPS terminal and the distance. The pedometer 40 can be reset at the input section 35B each time the person return to the vehicle.

Figure 5:
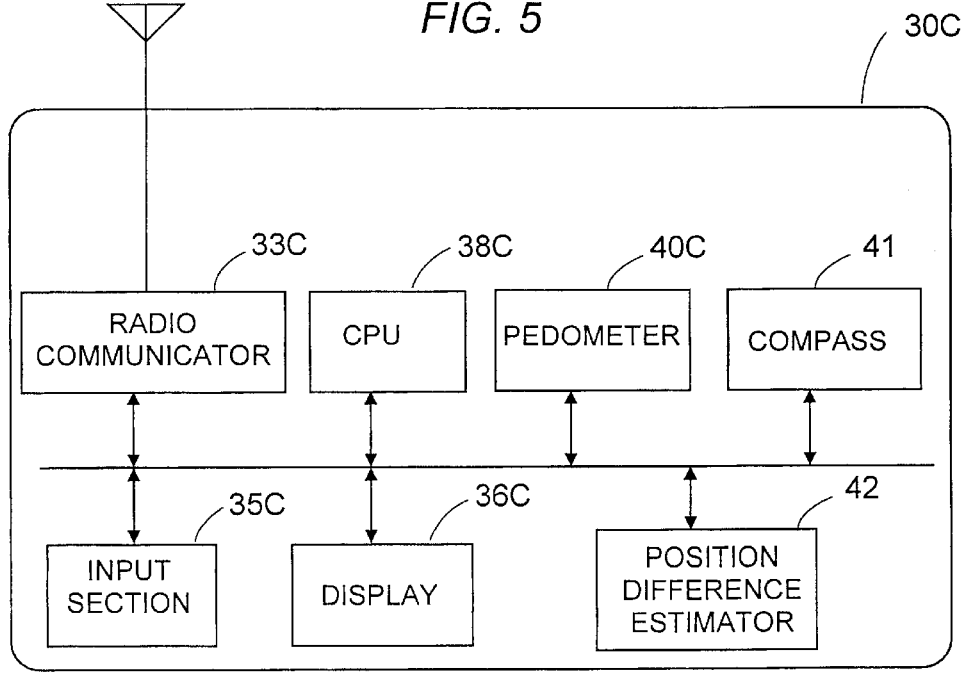
FIG. 5 is a block diagram showing an internal structure of a mobile terminal utilized in a system of a fourth embodiment of the present invention.

Fourth Embodiment <FIG. 5>

FIG. 5 shows a system in accordance with a fourth embodiment of the present invention which is identical to the third embodiment except for an addition of a compass 41 and a position difference estimator 42 to the mobile terminal 30C. Like units are designated by like reference numerals with a suffix letter of "C". The compass 41 constantly monitors a direction in which the person walks. The direction detected at the compass 41 and the footsteps counted at the pedometer 40C are fed to the position difference estimator 42 where they are processed to give an estimated distance between the person and the GPS terminal, while canceling a roundabout route as well as a going-and-coming route. The estimated distance is transmitted through the GPS terminal to the message center so as to be processed therein in a like manner as in the third embodiment for reliably locating the position of the person around the GPS terminal.

Figure 6:
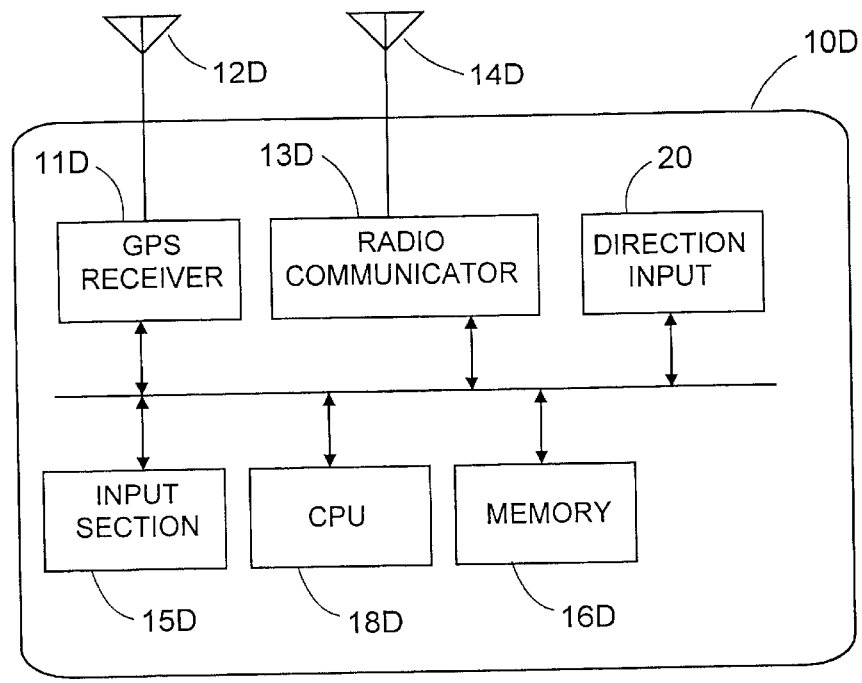
FIG. 6 is a block diagram showing an internal structure of a GPS terminal utilized in a system of a fifth embodiment of the present invention.

Fifth Embodiment <FIG. 6>

FIG. 6 shows a system in accordance with a fifth embodiment of the present invention which is identical to the first embodiment except that the GPS terminal 10D is provided with a direction input or direction entry means 20 instead of the position difference processor. Like units are designated by like reference numerals with a suffix letter of "D". The direction input 20 receives an entry of a direction in which the person carrying the mobile terminal intends to move away from the GPS terminal 10D, i.e., the vehicle. In reply to the support-request signal, the GPS terminal 10D transmits the direction along with the GPS data and the GPS terminal ID number to the message center so that the message center can estimate the position of the person based upon the calculated position of the GPS terminal and the direction.

Figure 7:
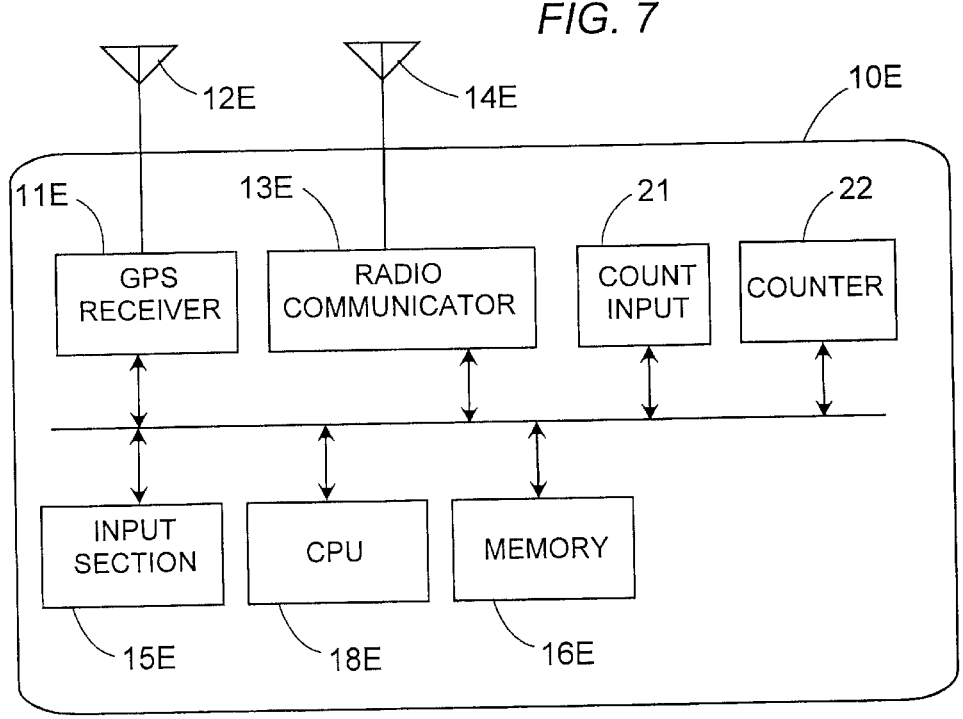
FIG. 7 is a block diagram showing an internal structure of a GPS terminal utilized in a system of a sixth embodiment of the present invention.

Sixth Embodiment <FIG. 7>

FIG. 7 shows a system in accordance with a sixth embodiment of the present invention which is identical to the first embodiment except that the GPS terminal 10E includes a count input 21 and a counter 22 in order to acknowledge whether the person has not returned to the GPS terminal within a scheduled absence time period. Like units are designated by like reference numerals with a suffix letter of "E". The count input 21 receives an entry of the scheduled absent time period during which the person intends to be away from the vehicle or the GPS terminal 10E, and includes a set-and-reset key which starts and reset counting the time made at the counter 22. When the counted time exceeds the scheduled absent time period, i.e., when the resetting of time is not made within that time period, CPU 18E generates a warning message indicative of that the person has not returned by some reason and instructs the GPS receiver 11E to acquire the GPS data. Then, CPU 18E further instructs the radio communicator 13E to transmit the GPS data and the associated GPS terminal ID number together with the warning message to the message center so that the message center can acknowledge that the person is involved in a trouble and not able to send the support request, and notify a corresponding warning on the display and the calculated position of the GPS terminal, prompting to take a suitable rescue of the person. Thus, even in the absence of the support-request signal from the person, the message center can acknowledge that the person is in a difficult situation when the person is not returned to the vehicle or the GPS terminal as scheduled.

In order to avoid unnecessary and erroneous warning, the GPS terminal 10E may be configured to request a confirmation by the person prior to giving the warning message to the message center For this purpose, the CPU 18E may be programmed to issue a confirmation signal to the mobile terminal and to stop counting the time when the counted time exceeds the scheduled absent time. In reply to the confirmation signal, the mobile terminal notifies the person at the display or an incorporated speaker that the absent time period is over and requests whether an extension of the time period is needed. In this instance, the mobile terminal is configured that the input section is capable of receiving entry of an extension request as well as a requested extension time. Upon entry of the extension request and the extension time, the mobile terminal transmits the data in the form of an extension-request signal back to the GPS terminal 10E. With this consequence, the count input 21 of the GPS terminal updates the scheduled absent time period and the counter 22 resumes counting the time. In the absence of the extension-request signal, the GPS terminal 10E gives the warning message and transmits the message together with the GPS data to the message center as explained in the above. The GPS terminal may be programmed to repeat the routine of requesting the confirmation over definite or indefinite cycles until a hardware reset is made to the GPS terminal.

Figure 8:
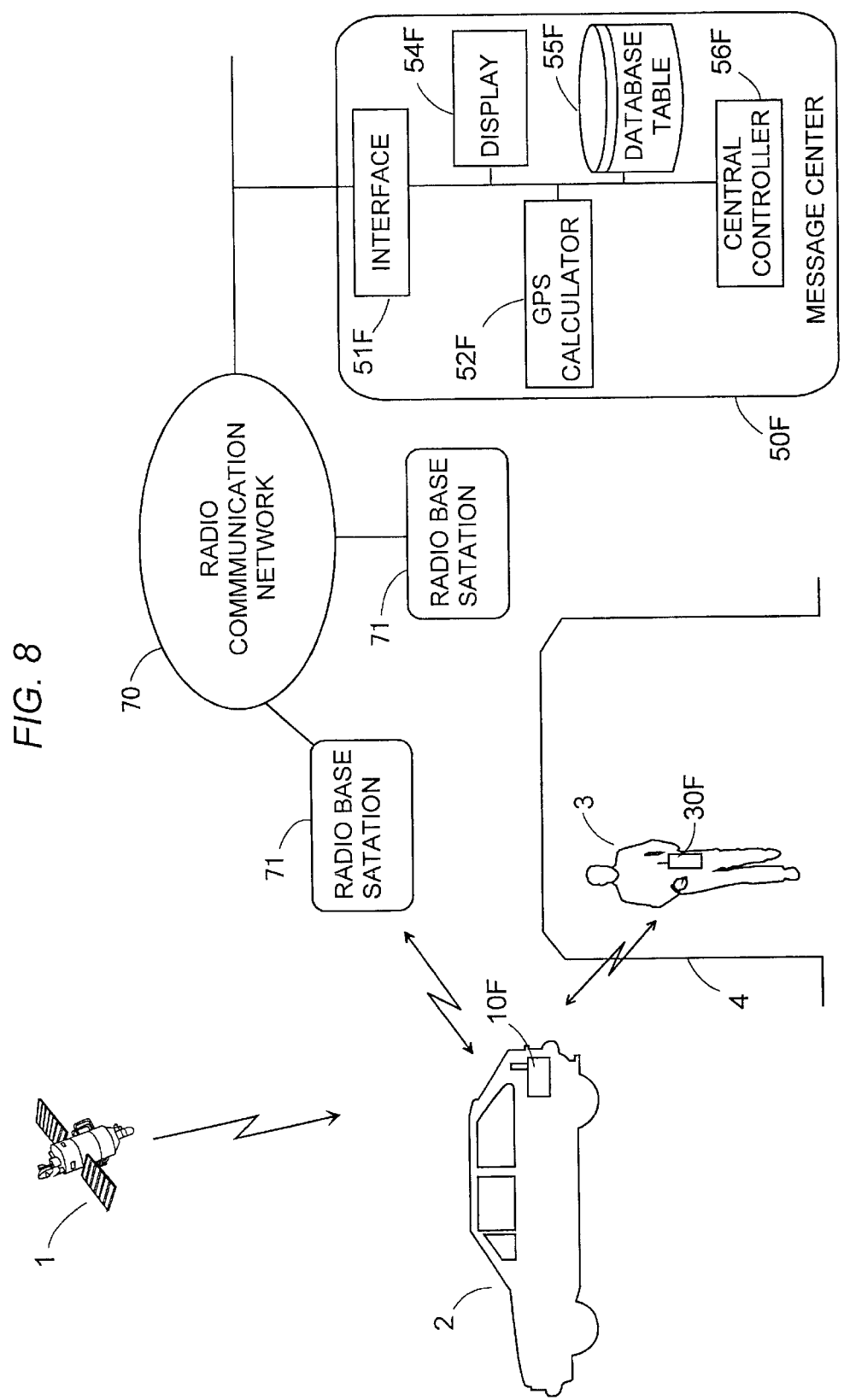
FIG. 8 is a schematic diagram showing a system in accordance with a seventh embodiment of the present invention.

Seventh Embodiment <FIGS. 8 and 9>

Figure 9B:
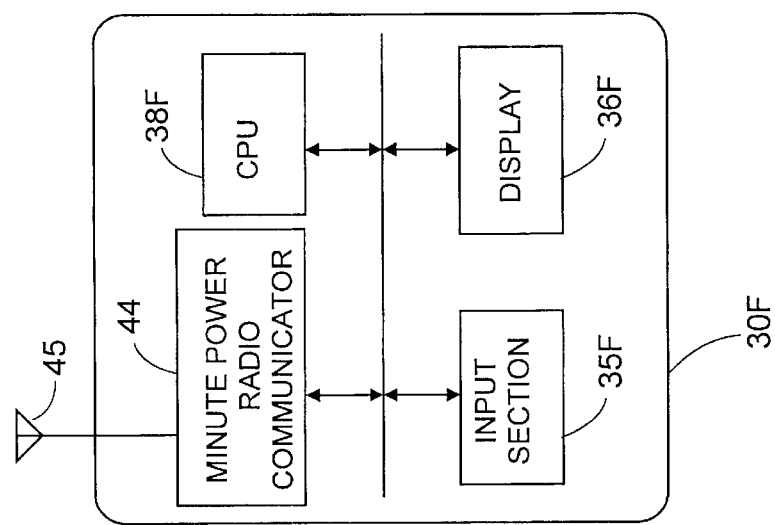
FIGS. 9A and 9B are block diagrams respectively showing internal structures of a GPS terminal and a mobile terminal utilized in the above system.
Figure 9A:
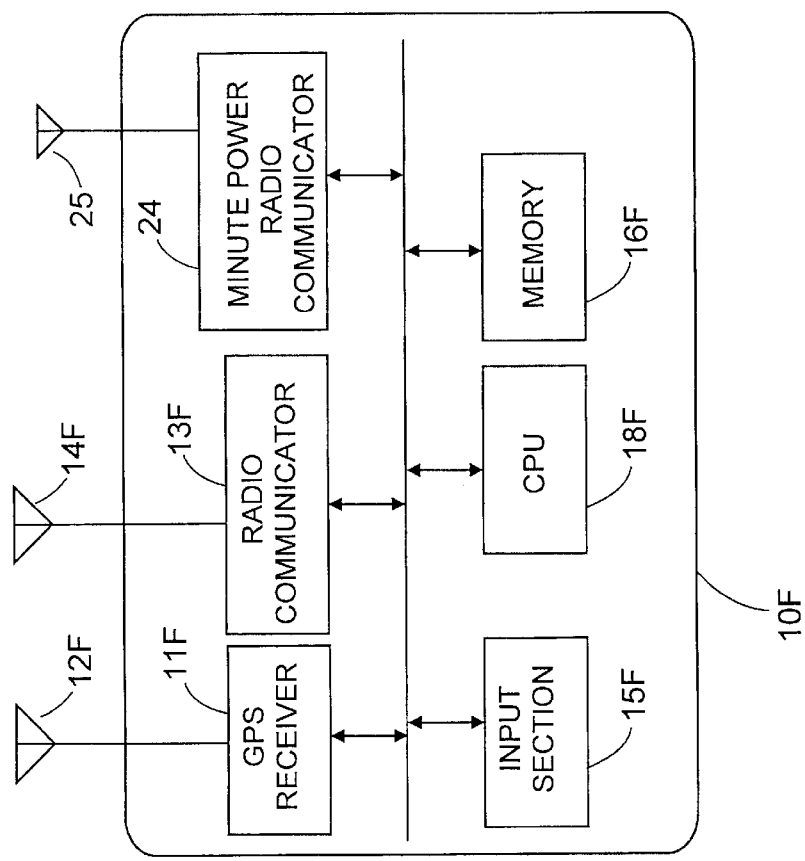

FIG. 8 shows a system in accordance with a seventh embodiment of the present invention which is identical to the first embodiment except that the GPS terminal 10F communicates with the mobile terminal 30F by way of a minute power communication provided separately from the cellular phone communication network. Like units and objects are designated by like reference numerals with a suffix letter of "F". For this purpose, the GPS terminal 10F and the mobile terminal 30F additionally include, as shown in FIGS. 9A and 9B, minute power radio communicator 24 and 44 with antennas 25 and 45, respectively. The radio communicators 24 and 44 are activated to communicate with each other at a regular interval in order that the mobile terminal 30F can check under the control of CPU 38F whether or not the mobile terminal 30F is within an effective range for communication with the GPS terminal 10F, Upon the mobile terminal 30F being judged to be out of the effective range, CPU 38F issues a disable signal which in turn provides an out-of-range message on the display 36F, thereby prompting the person to come back into the effective range if requiring to communicate with the GPS terminal 10F. The support-request signal is transmitted from the mobile terminal 30F to the GPS terminal 10F over the minute power radio communication, after which the GPS terminal 10F operates in the same manner as in the previous embodiments. Therefore, no duplicate explanation is made herein.

Figure 10:
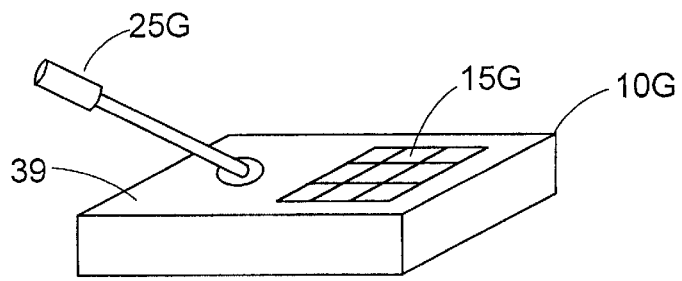
FIG. 10 is a perspective view of a GPS terminal utilized in a system of an eighth embodiment of the present invention.
Figure 11:
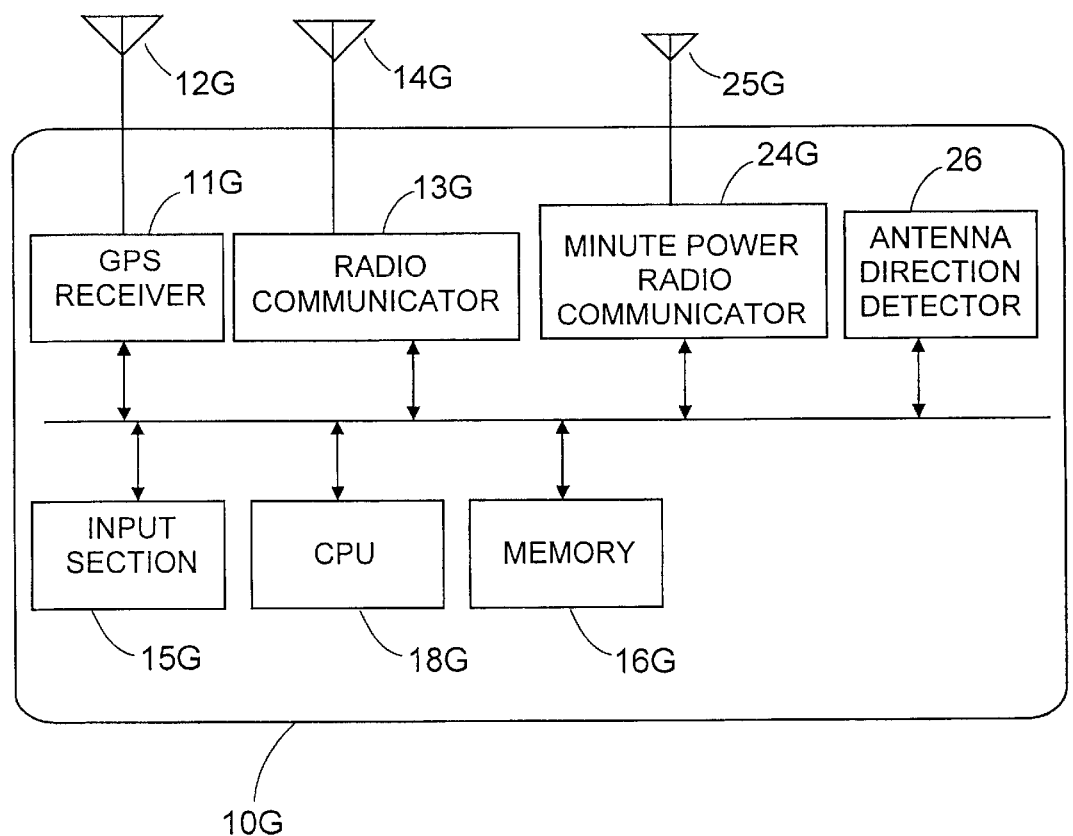
FIG. 11 is a block diagram showing an internal structure of a GPS terminal utilized in the above system.

Eighth Embodiment <FIGS. 10 and 11>

FIGS. 10 and 11 show a system in accordance with an eighth embodiment of the present invention which is identical to the seventh embodiment except that the GPS terminal 10G additionally includes an antenna direction detector 26 for detection of the antenna 25G directed to the mobile terminal. Like units are designated by like reference with a suffix letter of "G". The antenna 25G has a strong directivity for reliable communication with the mobile terminal over a long distance and is pivotally supported to a terminal casing 39 so to be capable of adjusting its direction. The antenna direction detector 26 monitors the direction of the antenna which is stored in the memory 16G and is attached to the GPS data when it is transmitted to the message center in response to the support-request signal. The antenna direction is processed at the message center to estimate the position of the person in relation to the calculated position of the GPS detector as is made in the fifth embodiment.

Figure 12:
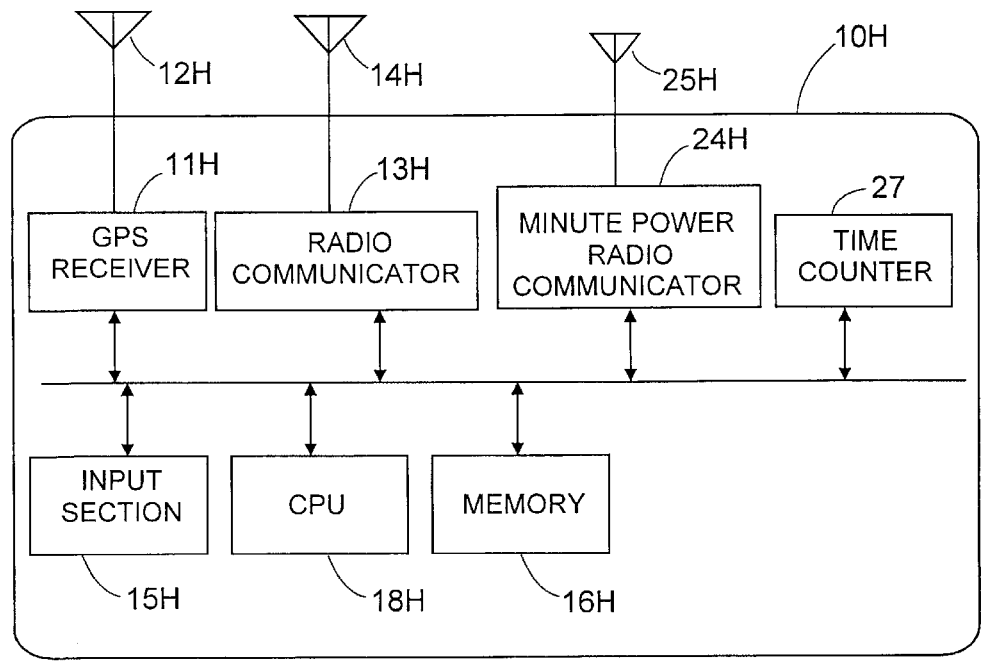
FIG. 12 is a block diagram showing an internal structure of a GPS terminal utilized in a system of a ninth embodiment of the present invention.

Ninth Embodiment <FIG. 12>

FIG. 12 shows a system in accordance with a ninth embodiment of the present invention which is identical to the seventh embodiment except that the GPS terminal 10G additionally includes a time counter 27 which counts a time while the mobile terminal is out of the effective range for communication with the GPS terminal 10G. Like units are designated by like reference numerals with a suffix letter of "H". The GPS terminal 10H communicates regularly with the mobile terminal to check whether or not the mobile terminal is within the effective communication range. When the mobile terminal, i.e., the person is acknowledged to firstly go out of the effective range, the time counter 27 starts counting the time, and at the same time CPU 18H issues the out-of-range message which is transmitted to the mobile terminal for prompting the person to come back into the effective range, The time counting continues and is reset to zero when the person comes back to the effective range. Therefore, if the person does not come back to the effective range within a predetermined time, i.e., the counted time exceeds the predetermined time, CPU 18H generates a time warning signal which, in turn, instructs the GPS receiver 11H to take the GPS data, and activates the radio communicator 13H to transmit the time warning signal along with the GPS data and the GPS terminal ID number to the message center. Thus, the GPS data is acknowledged at the message center even in the absence of the explicit support-request and is processed to locate the position of the GPS detector which is notified together with a corresponding warning message that the person is possibly involved in a trouble and not capable of returning near the person's vehicle or the GPS terminal, necessitating a rescue.

Figure 13:
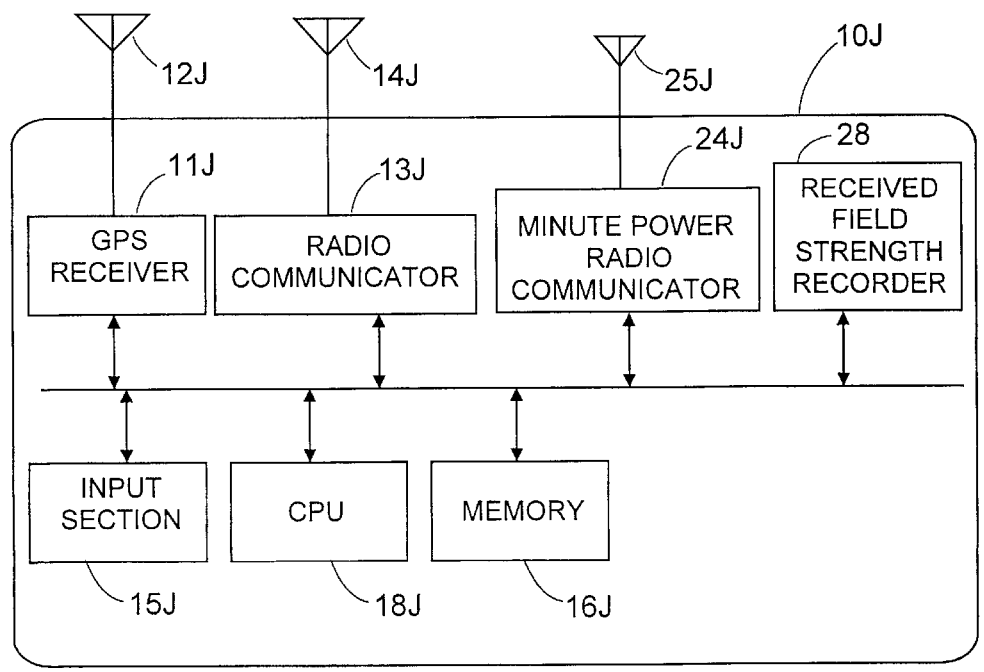
FIG. 13 is a block diagram showing an internal structure of a GPS terminal utilized in a system of a tenth embodiment of the present invention.
Figure 14:
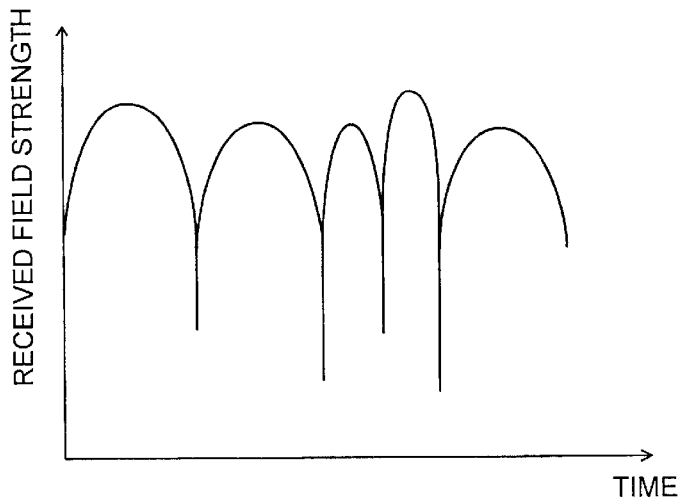
FIG. 14 is a graph of a received field strength of a radio signal received at the GPS terminal of FIG. 13.

Tenth Embodiment <FIGS. 13 and 14>

FIG. 13 shows a system in accordance with a tenth embodiment of the present invention which is identical to the seventh embodiment except that the GPS terminal 10J additionally includes a received field strength recorder 28 for recording a received field strength for the minute power radio communication with the mobile terminal. Like units are designated by like reference numerals with a suffix letter of "J". Upon receiving the support-request signal from the mobile terminal, CPU 18J of the GPS terminal 10J responds to record the received field strength for a predetermined period, for example, several seconds to obtain the data of the received field strength which may vary with respect to time due to a multi-pass effect. Thus obtained data is then transmitted together with the GPS data and the GPS terminal ID number to the message center. The data of the received field strength, as shown for example in FIG. 14, is analyzed at the message center to determine a distance between the mobile terminal and the GPS terminal. That is, the message center includes has a function of analyzing the data of the received field strength with respect to time, i.e., analyzing the shape of the graph shown in FIG. 14 in order to cancel the multi-pass effect so as to determine the distance reliably. Thus determined distance is processed at the message center to locate the position of the person carrying the mobile terminal around the calculated position of the GPS terminal, Eleventh Embodiment <FIGS. 15 and 16>

Figure 15:
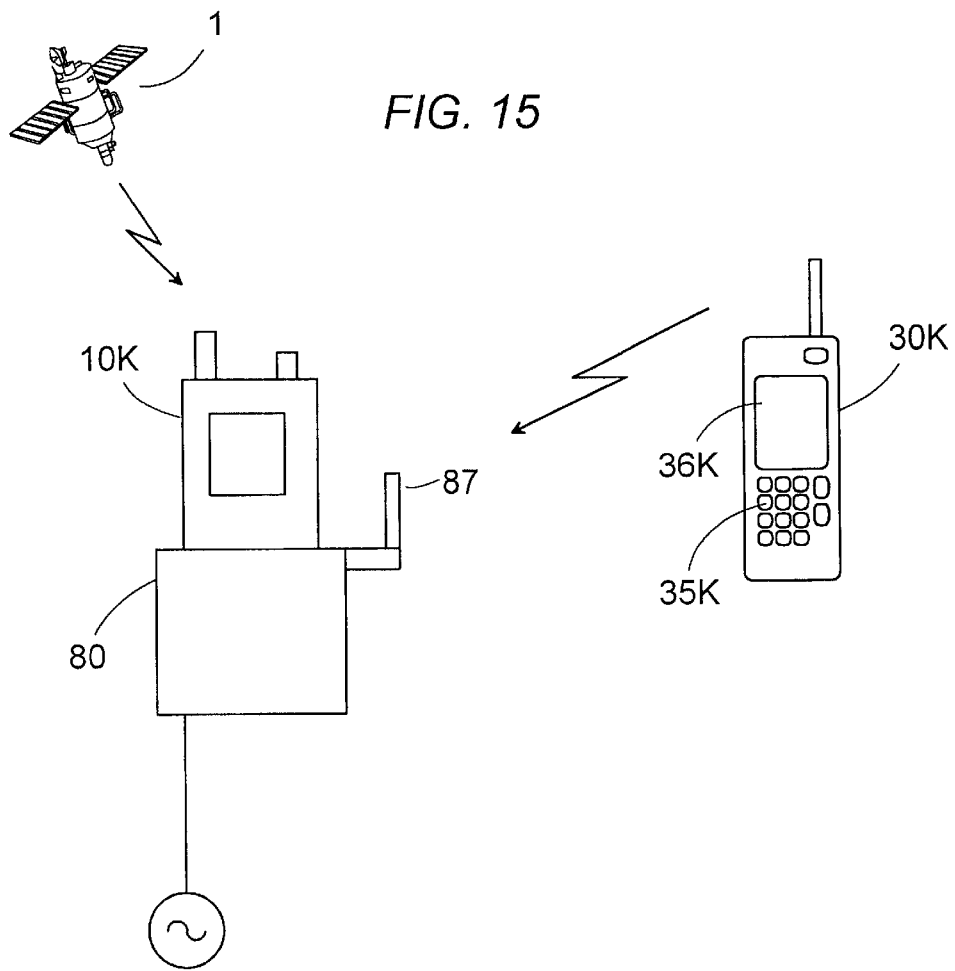
FIG. 15 is a schematic view of a system in accordance with an eleventh embodiment of the present invention.
Figure 16:
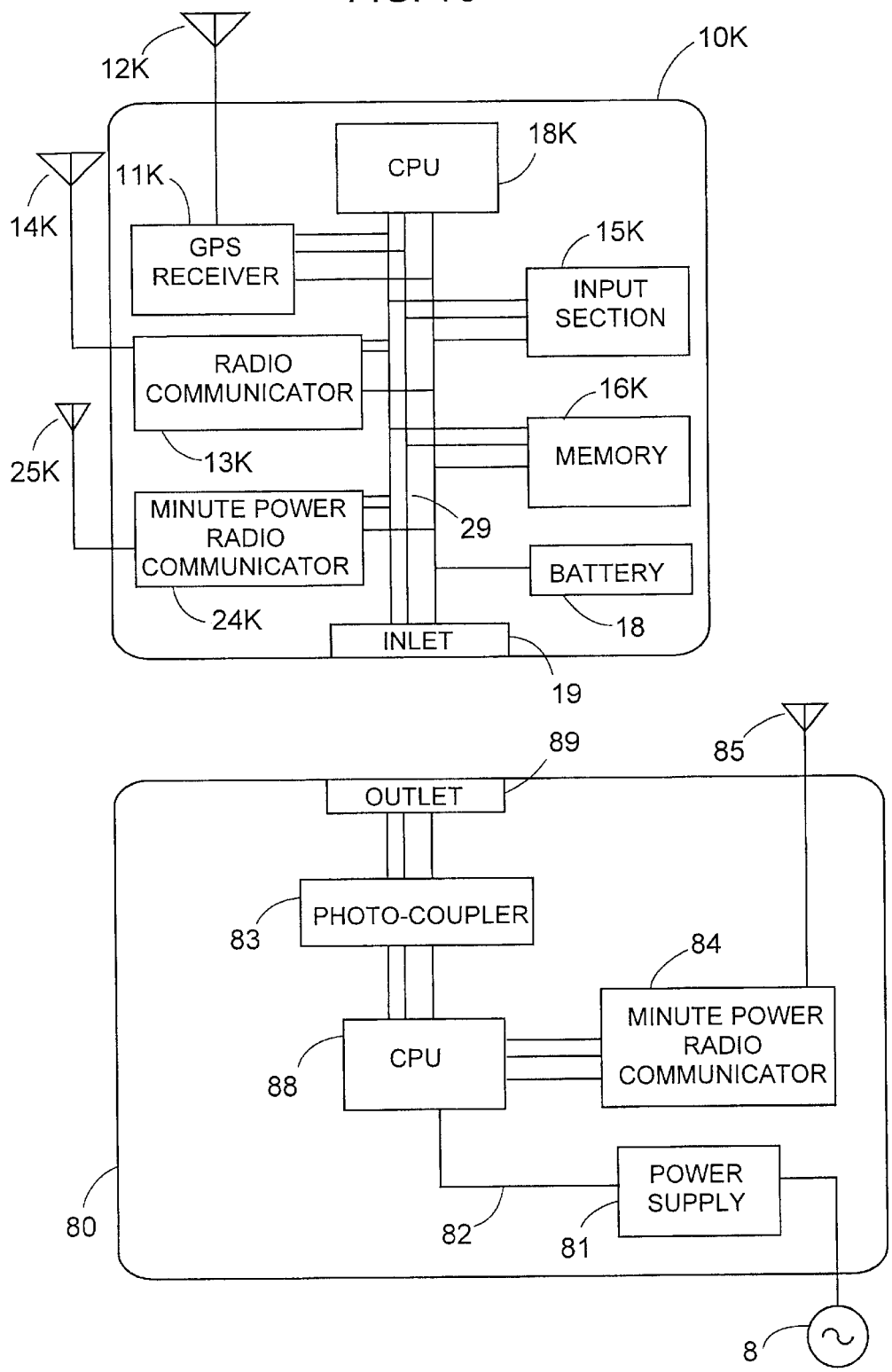
FIGS. 16A and 16B are block diagrams respectively showing internal structures of a GPS receiver and a charger utilized in the above system.

FIG. 15 shows a system in accordance with an eleventh embodiment of the present invention which is identical to the seventh embodiment except that the GPS terminal 10K can communicate with the mobile terminal 30K also by way of a charger 80 for an rechargeable battery incorporated in the GPS terminal. Like units are designated by like reference. Numerals with a suffix letter of "K". The present embodiment is designed for a situation where the GPS terminal 10K is brought back to a home or the like premises as being detached from the vehicle for charging the battery 18. Even in this situation, the valid GPS data accompanied with the support-request signal can be successfully acknowledged by the message center simply by keeping the GPS terminal 10K near a window or a like location where the GPS satellites can be reached. In this home use, the GPS terminal 10K is coupled to the charger 80 to have the battery 18 charged and is energized by a power supply 81 which is incorporated in the charger to provides a DC voltage from an AC power line 8 or voltage source, as shown in FIG. 16. In this connection, the charger 80 has an outlet 89 for direct coupling with an inlet 19 of the GPS terminal 10K. When the GPS terminal 10K is mounted to the charger 80, the antenna 25K of minute power radio communicator 24K may be disabled so that the support-request signal is only received by way of the charger 80

The charger 80 includes a minute-power radio communicator 84 with an antenna 85 for communication with the mobile terminal 30K and a CPU 88 which decodes the support-request signal received from the mobile terminal 30K into a suitable format to be fed to the GPS terminal 10K through a photo-coupler 83. Upon receiving the support-request from the charger 80 through a bus 29, CPU 18K of the GPS terminal 10K responds to acquire the GPS data and transmit the GPS date together with the support-request signal and the GPS terminal ID number to the message station through the radio communication network so that the message center can acknowledge the support-request signal to process the required actions as described in the previous embodiment.

Figure 17:
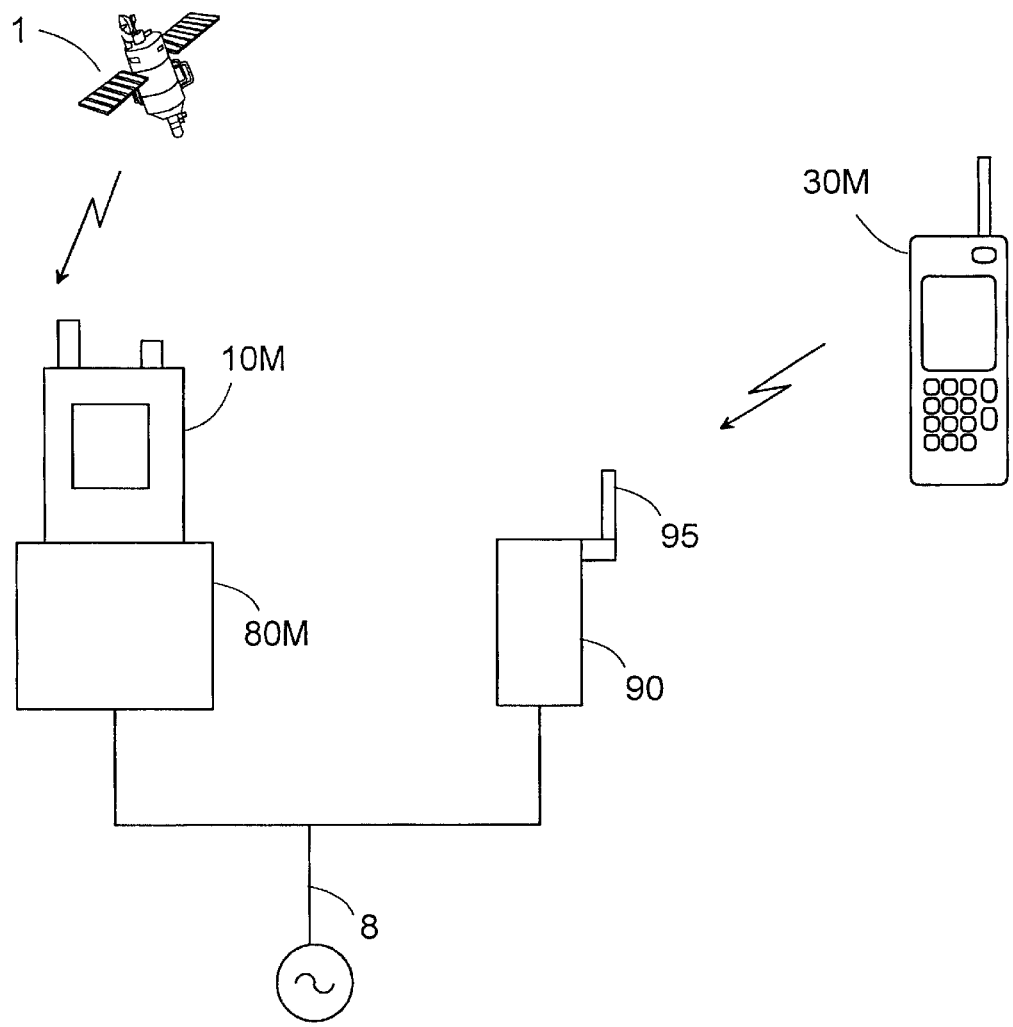
FIG. 17 a schematic view of a system in accordance with a twelfth embodiment of the present invention.
Figure 18:
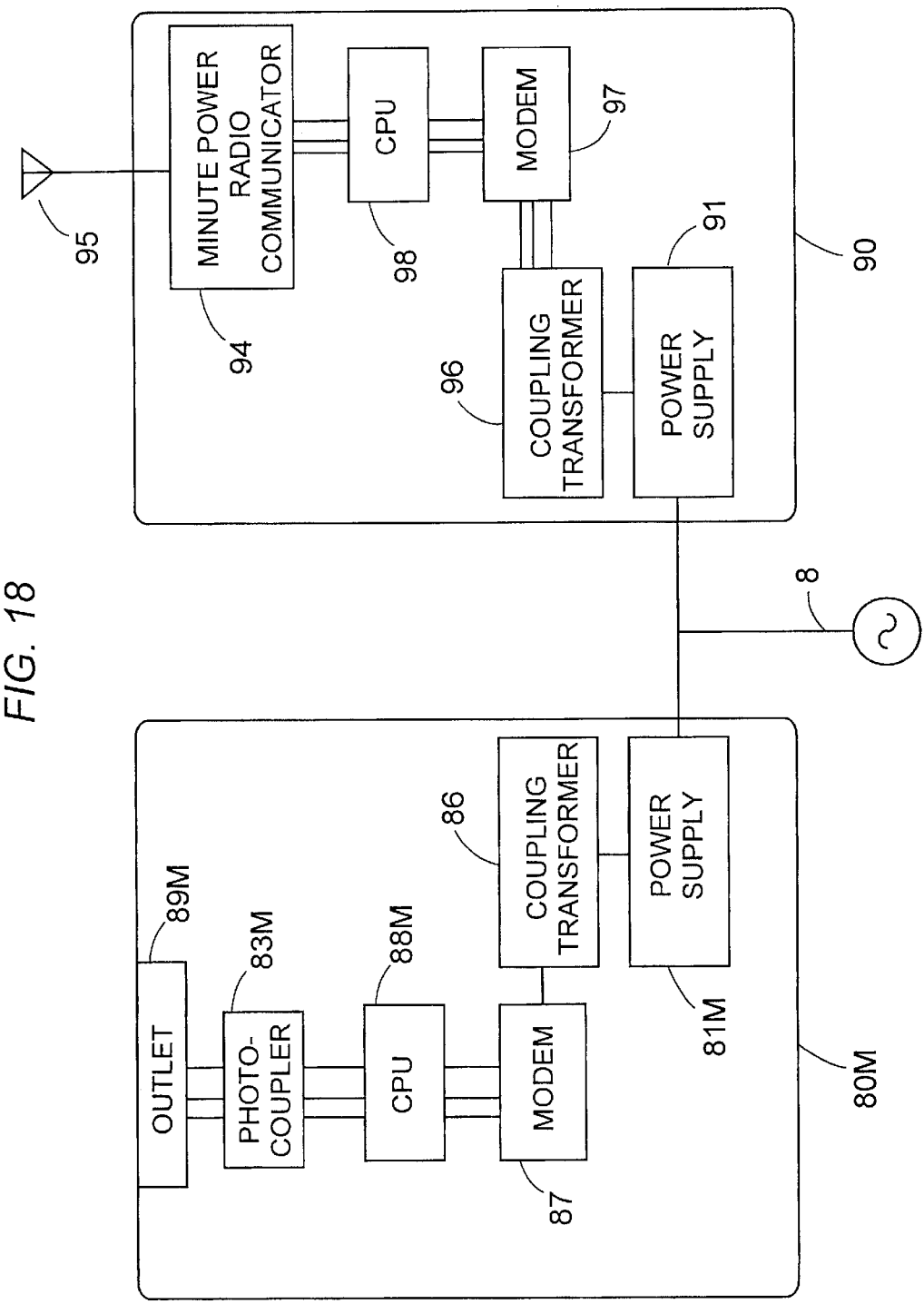
FIG. 18 is a block diagram showing internal structures of a charger and an intermediate receiver and a charger utilized in the above system.

Twelfth Embodiment <FIGS. 17 and 18>

FIG. 17 shows a system in accordance with a twelfth embodiment of the present invention which is identical to the eleventh embodiment except for an addition of an intermediate receiver 90 for transferring the support-request signal from the mobile terminal 30M to the GPS terminal 10M. Like units are designated by like reference numerals with a suffix letter of "M". The present embodiment is particularly contemplated to realize a successful transmission of the support-request signal from the mobile terminal 30M to the GPS terminal 10M over a prolonged distance, taking into account that the person carrying the mobile terminal 30M might move a relatively long distance even within the premises from the GPS terminal 10M placed near the window at one location of the premises. The intermediate receiver 90 is connected to the AC power line 8 to be energized thereby and at the same time connected to the charger 80M by use of the AC power line 8. Thus, the intermediate receiver 90 can be installed away from the charger 80M, i.e., the GPS terminal 10M wherever the AC power line is available.

As shown in FIG. 18, the intermediate receiver 90 includes a power supply 91 providing a DC voltage from the AC line voltage, a minute power radio communicator 94 with an antenna 95 for radio communication with the mobile terminal 30M, and a CPU 98 controlling the operations of the receiver 80M. The support request signal received through the radio communicator 94 is decoded under the control of CPU 98 into a suitable format and is fed to a MODEM 93 where it is modulated or superimposed on a line voltage to be subsequently fed through a coupling transformer 96 to the AC power line 8.

The charger 80M includes a power supply 81M providing a DC voltage from the AC power line 8, and a coupling transformer 86 for feeding the support-request signal to a MODEM 87 where it is demodulated or extracted from the AC line voltage under the control of CPU 88M. Then, the support-request signal is fed through the photo-coupler 83M and the outlet 89M to the GPS terminal 10M. The DC voltage form the power supply 81M is fed through the outlet 89M to charge the battery of the GPS terminal 10M and energize the GPS terminal. Upon receiving the support-request signal, the GPS terminal 10M acquires the GPS data from the GPS satellite and transmits the GPS data together with the GPS terminal ID number and the support-request signal to the message center in the same manner as described in the first embodiment. Then, the message center responds to take the necessary actions also as described in the first embodiment for notifying the need of the support or rescue.

It is noted that the individual features in the above-mentioned embodiments could be suitably combined so as to provide a sophisticated system for locating the position of the person requesting the support.

LIST OF REFERENCE NUMERALS

1 GPS satellite
2 vehicle
3 person
4 premises
8 AC power line
10 GPS terminal
11 GPS receiver
12 GPS antenna
13 radio communicator
14 radio antenna
15 input section
16 memory
17 CPU -continued

LIST OF REFERENCE NUMERALS 18 battery
19 inlet
20 direction input
21 count input
22 counter
24 minute power radio communicator
25 antenna
26 direction detector
27 time counter
28 received field strength recorder
29 bus
30 mobile terminal
33 radio communicator
34 radio antenna
35 input section
36 display
37 position difference processor
38 CPU
39 casing
40 pedometer
41 compass
42 position difference estimator
44 minute power radio communicator
50 message center
51 interface
52 GPS calculator
53 position difference compensator
54 display
55 database table
56 central controller
57 GPS calling device
58 call number verifier
70 radio communication network
71 base station
80 charger
81 power supply
82 bus
83 photo-coupler
84 minute power radio communicator
85 antenna
86 coupling transformer
87 MODEM
88 CPU
89 bus
90 Intermediate receiver
91 power supply
94 minute power radio communicator
95 antenna
96 coupling transformer
97 MODEM

What is claimed is:

1. A support request processing system using GPS data for locating a person requesting a support, said system comprising:

a GPS terminal, said GPS terminal receiving the GPS data from GPS satellites and transmits the GPS data to a wireless communication network;

a message center which receives the GPS data from said GPS terminal through said wireless communication network for processing the GPS data to obtain a position of said GPS terminal; and a mobile terminal provided separately from said GPS terminal to be carried by a person, said mobile terminal providing wireless communication either directly or indirectly with said GPS terminal and having a request key which issues a support-request signal upon being activated;

said GPS terminal having a transmit means which, in response to said support-request signal, transmits said GPS data to said message center, at least one of said GPS terminal and said mobile terminal having an identification (ID) code which is transmitted through said wireless communication network to said message center as a result of that said support-request signal is transmitted to said message center, said message center having a table storing a relation between said ID code and personal information about the person carrying said mobile terminal so that said message center can relate the position of the GPS terminal to the person giving the support-request signal, and said message center having an alarm means which gives a support-request message including said personal information and the related position of the GPS terminal for prompting a suitable support action.

2. The system as set forth in claim 1, wherein said mobile terminal transmits said support-request signal to said GPS terminal through said wireless communication network.

3. The system as set forth in claim 2, wherein said message center has a GPS calling device which, in response to said support-request signal, issues a GPS call signal to said GPS terminal through said wireless communication network, said GPS terminal being activated by said GPS call signal to receive the GPS data from the GPS satellites and transmit the GPS data to said message center.

4. The system as set forth in claim 3, wherein said mobile terminal has an ID data transmitting means of transmitting to said message center an identification (ID) data assigned to said mobile terminal, said GPS calling device having a discriminating means which verifies said ID data and issues said GPS call signal only when said ID data from the mobile terminal matches one of registered ID data stored in said message center.

5. The system as set forth in claim 3, wherein said GPS calling device has a registration means for registration of a call number assigned to said mobile terminal, said message center including a call number verifying means which verifies said call number and allows said GPS calling device to issue said GPS call signal only when the call number is registered in said registration means.

6. The system as set forth in claim 2, wherein said mobile terminal has an input mean for entering a positional difference data indicating a positional difference between said mobile terminal and said GPS terminal, said positional difference data being transmitted to said GPS terminal together with said support-request signal, said GPS terminal responding to said support-request signal for transmitting said GPS data together with said positional difference data to said message center so that said message center can estimate a location of the person around said GPS terminal.

7. The system as set forth in claim 2, wherein said mobile terminal has a pedometer which counts the number of footsteps in walking by a person carrying the mobile terminal away from said GPS terminal to obtain a distance between said mobile terminal and said GPS terminal, said mobile terminal having a means of transmitting the distance along with said support-request signal to said GPS terminal, said GPS terminal having a means of transmitting said distance together with said GPS data to said message center in response to said support-request signal so that said message center can estimate a location of the person around said GPS terminal.

8. The system as set forth in claim 2, wherein said mobile terminal includes:
a pedometer which counts the number of footsteps in walking by a person carrying the mobile terminal away from said GPS terminal,
a direction detector for detection of a direction in which the person walks away from said GPS terminal; and
an estimating means for analyzing the number of said footsteps and said direction to give an estimated distance between said GPS terminal and aid mobile terminal carried by the person, said estimated distance being transmitted together with said support-request signal to said GPS terminal, said GPS terminal, in response to said support request signal, transmitting the GPS data as well as said estimated distance to said message center so that said message center can estimate a location of the person around said OPS terminal.

9. The system as set forth in claim 2, wherein said GPS terminal has a direction entry means for entering a direction in which the person carrying said mobile terminal moves away from said GPS terminal, and said GPS terminal, in response to said support request signal, transmitting said direction along with said GPS data to said message center so that said message center can estimate a location of the person around said GPS terminal.

10. The system as set forth in claim 2, wherein said GPS terminal includes:
a timer counting a time;
a set-and-reset means for setting a scheduled absent time period during which the person carrying said mobile terminal intends to be away from said GPS terminal and activating said timer to count the time, and for resetting said timer to stop counting the time; and
a return-check means which judges whether or not the timer is reset within said scheduled absent time period and issues a warning signal when the timer is not reset within said scheduled absent time period, said GPS terminal acting in consequence of said warning signal to transmit said GPS data together with said warning signal to said message center so that said message center can give a warning message indicative of that the person has not returned to said GPS terminal within said scheduled absent time and locate the position of the GPS terminal.

11. The system as set forth in claim 2, wherein said GPS terminal includes:
a timer counting a time;
a set-and-reset means for setting a scheduled absent time period during which a person carrying said mobile terminal intends to be away from said GPS terminal and activating said timer to count the time, and for resetting said timer to stop counting the time; and
a return-check means which judges whether or not the timer is reset within said scheduled absent time period and issues a confirmation signal to said mobile terminal when me timer is not reset within said scheduled absent time period, said mobile terminal having an extension means capable of issuing an extension-request signal in reply to said confirmation signal;

said GPS terminal acting in the presence of said extension-request signal to extend said scheduled absent time period and otherwise acting to provide an absent warning and to transmit said GPS data together with said absent warning to said message center so that said message center can give a warning message indicative of that the person has not returned to said GPS terminal within said scheduled absent time and locate the position of the GPS terminal.

12. The system as set forth in claim 1, wherein
said mobile terminal communicates with said GPS terminal by way of a minute power radio communication for transmitting said support-request signal to said GPS terminal.

13. The system as set forth in claim 12, wherein
said mobile terminal includes:
  a communication check means which checks regularly whether the mobile terminal is within an effective range for communication with said GPS terminal and provides a disable signal when said mobile terminal goes out of said effective range, and
  a display which displays a out-of-range message in response to said disable signal.

14. The system as set forth in claim 12, wherein
said GPS terminal includes:
  an antenna having varying directivity for communication with said mobile terminal, and
  a direction detector which detects a direction in which said antenna shows the directivity,
said GPS terminal acting, in response to said support-request signal, to transmit the GPS data as well as the direction detected by said direction detector to said message center so that said message center can estimate a location of the person around said GPS terminal.

15. The system as set fort in claim 12, wherein
said GPS terminal includes a recording means which records a received field strength varying with time for wireless communication with said mobile terminal,
said GPS terminal, in response to said support-request signal, transmitting data of the received field strength along with said GPS data to said message center,
said message center having a means which analyzes said data of the received field strength varying with time to estimate a location of the person around said GPS terminal.

16. The system as set forth in claim 13, wherein
said GPS terminal includes:
  a time counter which counts a time while said mobile terminal is out of range for communication with said GPS terminal, and
  a check means which issues a time warning signal when the counted time exceeds a predetermined level,
said GPS terminal, in response to said time warning signal, transmitting the time warning signal together with the GPS data to said message center so that said message center can acknowledge and indicate that the person carrying said mobile terminal has not returned into the range capable for communication with said GPS terminal within a predetermined time.

17. The system as set forth in claim 1, further including:
a charger adapted to be coupled to said GPS terminal for charging a rechargeable battery incorporated in said GPS terminal to energize the same,
said charger having a radio communication means for receiving said support-request signal from said mobile terminal by way of a minute power radio communication, and
said GPS terminal having an inlet which is in direct connection with an outlet of said charger to receive said support-request signal received at said radio communication means.

18. The system as set forth in claim 1, further including:
an intermediate receiver which receives said support-request signal from said mobile terminal by way of a minute power radio communication, and
a charger adapted to be coupled to an AC power line so as to obtain therefrom a charging current for charging a rechargeable battery incorporated in and energizing said GPS terminal,
said intermediate receiver being coupled to said AC power line and having a superimpose means which superimposes said support-request signal upon an AC source voltage supplied through said AC power line,
said charger having a signal extract means which extracts said support-request signal from said AC source voltage and feeds the same to said GPS terminal, and
said charger has an outlet which is in direct contact with an inlet of said GPS terminal to feed said support-request signal thereto.

* * * * *